United States Patent [19]

Jeglinski

[11] 4,425,777

[45] Jan. 17, 1984

[54] METHOD OF AND DEVICE FOR MANUFACTURING A JET NOZZLE PLATE FOR INK JET PRINTERS

[75] Inventor: Werner Jeglinski, Bönningstedt, Fed. Rep. of Germany

[73] Assignee: U.S. Philips Corporation, New York, N.Y.

[21] Appl. No.: 313,866

[22] Filed: Oct. 22, 1981

[30] Foreign Application Priority Data

Nov. 11, 1980 [DE] Fed. Rep. of Germany ....... 3042483

[51] Int. Cl.³ .................... B21D 28/26; B21D 28/14; B23P 15/16
[52] U.S. Cl. .................................. 72/325; 72/465; 29/157 C; 83/176; 83/658
[58] Field of Search ............ 72/325, 324, 327, 55, 72/465; 29/157 C; 83/658, 176, 177, 53

[56] References Cited

U.S. PATENT DOCUMENTS

| | | |
|---|---|---|
| 2,438,837 | 3/1948 | Archer et al. .................. 72/465 |
| 2,781,849 | 2/1957 | Bladergroen et al. ............. 72/465 |
| 3,022,758 | 2/1962 | Rheingold et al. ............... 72/327 |
| 3,267,780 | 8/1966 | Roth ............................ 83/177 |
| 3,978,705 | 9/1976 | Pearce et al. .................. 72/327 |
| 3,986,379 | 10/1976 | Mansell ....................... 72/465 |

FOREIGN PATENT DOCUMENTS 47-27877 7/1972 Japan ............................ 83/177

Primary Examiner—Daniel C. Crane
Attorney, Agent, or Firm—Robert S. Smith

[57] ABSTRACT

To manufacture a jet nozzle, the nozzle plate is first drawn through a drawing ring of spring steel in one operation by a press and punch die having the internal dimensions of the jet nozzle, the plate subsequently being punched during further drawing in a hard elastic plastic block which serves as a cutting cushion. The drawing ring is then slightly pressed into the plastic. All parts of the press and punch tool which are subject to the pressure exerted by the die and the die itself have been polished to be free from hair lines.

2 Claims, 3 Drawing Figures

METHOD OF AND DEVICE FOR MANUFACTURING A JET NOZZLE PLATE FOR INK JET PRINTERS

BACKGROUND OF THE INVENTION

1. Field of the Invention

The invention relates to a method of manufacturing a jet nozzle plate for ink jet printers by means of a combined press and punch operation with a press mould in the form of a plastics cushion, and also relates to a device for performing the method.

2. Description of the Prior Art

In order to obtain individual ink droplets, the ink jet printing head usually has a jet nozzle plate which includes at least one jet nozzle. The diameter of the jet nozzle is very small and amounts to approximately 50 μm. The cross-section of the jet nozzle increases rotationally symmetrically in the direction of the side wherefrom the liquid is supplied in accordance with an exponential function in order to facilitate the supply of ink. The jet nozzle must have a smooth surface and sharp edges at the ejection side of the ink droplets. This surface is preferably formed to project from the surroundings. A tubular jet nozzle of this kind is known from U.S. Pat. No. 3,466,659 (German Auslesgeschrift 15 11 397.)

It is known to manufacture such jet nozzle plates by spark erosion, by drilling or by etching. Because the dimensions of the jet nozzles are in the micrometer range, these known methods do not offer the required precision. Either the inner walls of the jet nozzles are too rough or the edges of the discharge opening are not sharp enough. A pure stamping operation does not provide the desired dimensional accuracy either, because there is a risk of cracking of the discharge opening of the jet nozzle.

SUMMARY OF THE INVENTION

It is an object of the invention to provide a method of and a device for manufacturing such jet nozzle plates where the jet nozzles have accurately defined edges in the discharge zone which is situated exactly concentrically over the surrounding area of the plate. It is assumed that it is known per se to bend or deform plates by means of elastic rubber cushions, for example, from the book by Oehler, "Biegen unter Pressen, Abkantpressen, Abkantmaschinen, Walzenrundbiegemaschinen, Profilwalsmaschinen", 1963, pp. 159 to 163.

This object is achieved in that in one operation the jet nozzle plate is first drawn through a drawing ring of spring steel by a press and punch die having the internal dimensions of the jet nozzle and is subsequently punched during further drawing in a hard elastic plastic block as the cutting cushion. The drawing ring is also slightly pressed into the plastic block during pressing.

The method in accordance with the invention offers the advantage that the combination of pressing and punching on the one hand creates the projecting shape of the jet nozzle while on the other hand a burr-free jet nozzle opening with an accurately defined inner wall is obtained, even though the jet nozzle dimensions are very small.

The device for performing the method in accordance with the invention is characterized in that the press and punch die having the internal dimensions of the jet nozzle shape is polished and has a homogeneous hardness, the drawing ring made of spring steel being formed as a resilient band which rests on the hard elastic plastic block. The plastic block which preferably has a thickness of 2 mm is arranged on a hard backing, for example, steel. Polyoximethylene is an attractive material for the plastics block.

In order to obtain smooth flowing of the material of the jet nozzle plate, all areas of the die and the drawing ring which are subject to the press and punch pressure are preferably polished to be free from hair lines.

An embodiment of the method in accordance with the invention will be described in detail hereinafter.

DESCRIPTION OF THE PREFERRED EMBODIMENTS

Figure 1:
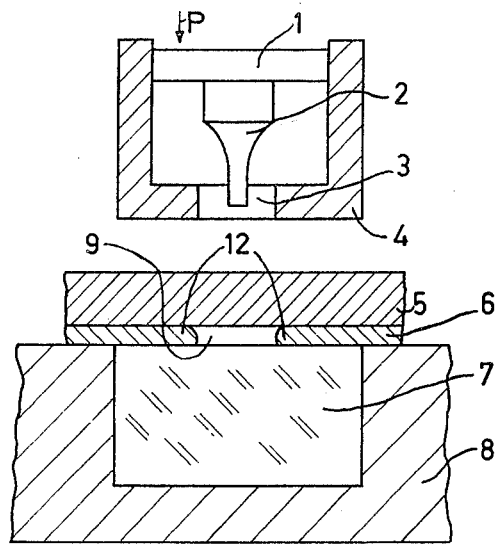
FIG. 1 shows a device for performing the method in accordance with the invention.

A press plate 1 which accommodates the punch and press die 2 is displaceably arranged in a holder 4. When a pressure P is exerted on the press plate 1, the holder 4 is moved in the direction of the arrow P until the lower side of the holder 4 rests on the jet nozzle plate 5. When the pressure is further increased, the die 2 is passed through the opening 3 of the holder 4.

The jet nozzle plate 5 to be formed is arranged on a resilient band 6, which itself is arranged on a plastic block 7. The resilient band 6 comprises a drawing ring 9, the edge zones 12 have been polished to be free from hair lines.

The plastic block 7 may have a circular or rectangular cross-section and is arranged in an opening of the anvil 8 which is preferably made of steel or cast-iron. The plastic block 7 is accommodated in the anvil 8 so that after the press and punch operation it can be displaced in the anvil and thus be replaced by a new plastic portion.

The shape of the die 2 is adapted to the predetermined shape of the jet nozzle, the die having a surface which has been polished to be free from hair lines and a homogeneous hardness. The homogeneous hardness can be obtained, for example, by means of a salt bath. The front part of the die 2 has a diameter of 50 μm in said embodiment.

The opening of the drawing ring 9 is dependent mainly on the predetermined length of the jet nozzle duct. For the jet nozzle plate 5 use is made of a nickel plate having a thickness of from 0.2 to 0.3 mm. The resilient band 6 has a thickness of 0.1 mm.

The height of the plastic block 7 amounts to approximately 2 mm and is dependent on the modulus of elasticity of the plastic chosen.

Figure 2:
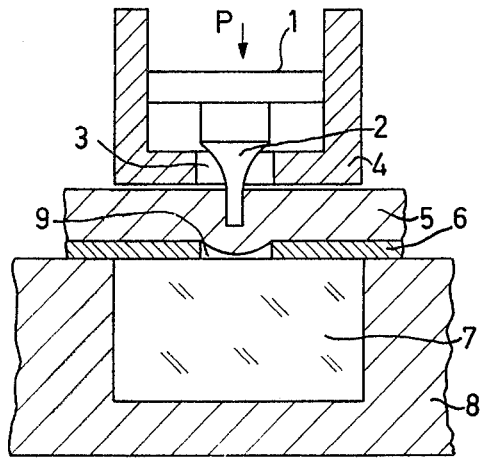
FIG. 2 shows the device of FIG. 1 during the press operation.
Figure 3:
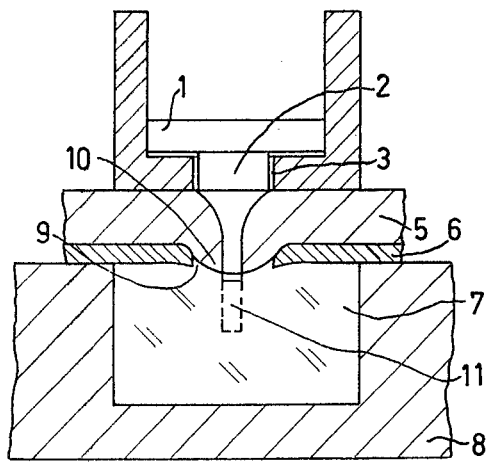
FIG. 3 shows the device of FIG. 1 after the punch operation.

FIG. 1 shows the situation before the press and punch operation and FIG. 2 illustrates the press operation. The front part of the flared die 2 has penetrated into the jet nozzle plate 5 and has already pressed the plate 5 into the drawing ring 9. When the pressure P exerted on the die 2 is further increased, the actual punch operation commences, the jet nozzle plate 5 being drawn further at the area of the die 2. This part of the jet nozzle plate 5 thus penetrates into the plastic block 7. At the same time, under the influence of the high pressure the drawing ring 9 is somewhat deflected as shown in FIG. 3.

The deflection is reversible, so that the resilient band 6 can be used several times. The portion 11 punched out of the jet nozzle plate 5 is pressed into the plastics block 7 by the force exerted on the die 2. After the punch operation has been completed and the die 2 and the holder 4 have been returned, the plastic block 7 is displaced in the anvil 8, together with the punched portion 11, so that it is replaced by a fresh plastic portion.

The resilient band 6 ensures that the raised portion 10 of the finished jet nozzle is concentric to the jet nozzle opening. The hard elastic plastic block 7 ensures a burr-free opening of the jet nozzle.

The ink jet nozzles obtained by means of this press and punch method have very favorable mechanical and physical properties. If more than one jet nozzle is to be punched into the jet nozzle plate 5, jet nozzles can be successively formed by means of the same die 2 by lateral displacement of the part of the device which is shown at the bottom in FIG. 1. However, it is alternatively possible to work a plate simultaneously with a number of adjacently arranged dies 2. Displacement of the plate is not necessary in that case, because all jet nozzle openings are formed simultaneously instead of consecutively.

What is claimed is:

1. A method of manufacturing a jet nozzle plate for ink jet printers by means of a combined press and punch operation with a press mould in the form of a cushion, comprising the steps of:
    disposing a jet nozzle plate on a drawing ring of resilient spring steel with the drawing ring having an opening exposing a hard elastic plastic block situated below said drawing ring and extending across said opening;
    drawing the jet nozzle plate through said opening of the drawing ring of spring steel by a press and punch die having the internal dimensions of the jet nozzle;
    subsequently punching said plate during further drawing in a hard elastic block as the cutting cushion; and
    slightly pressing the drawing ring into the plastic block during the press operation such that the perimeter of the drawing ring opening is deflected into the plastic block and the plate material drawn through the opening is given a raised burr-free surface.

2. A device for manufacturing a jet nozzle plate for ink jet printers by means of a combined press and punch operation with a press mould in the form of a cushion, comprising:
    a press and punch die having the internal dimensions of the jet nozzle;
    said press and punch die having been polished and having a homogeneous hardness;
    a press mould having a recess with a hard elastic plastic block filling said recess, whereby said press mould forms a hard backing for said block, said plastic block being made of polyoximethylene and having a thickness of approximately 2 mm;
    a drawing ring of spring steel having an opening and constructed as a resilient band overlying and in contact with the hard elastic plastic block plastic block extending across said opening;
    said press mould being situated opposite said press and punch die such that when a plate is located on the drawing ring of said press mould and said press and punch die are operated the plate is punched with the plate material being drawn through the opening in said drawing ring and against said plastic block as the drawing ring is deflected about said opening;
    the zones of said drawing ring which are subjected to pressure exerted on the die having been polished to be free from hair lines.

* * * * *